(12) United States Patent
Chavali et al.

(10) Patent No.: US 8,982,979 B2
(45) Date of Patent: Mar. 17, 2015

(54) METHODS AND SYSTEMS FOR REDUCING COMPLEXITY OF MIMO DECODER

(71) Applicant: Uurmi Systems Private Limited, Hyderabad (IN)

(72) Inventors: Nanda Kishore Chavali, Hyderabad (IN); Kranti Kumar Balaga, Vizianagaram (IN)

(73) Assignee: Uurmi Systems Private Limited (IN)

(*) Notice: Subject to any disclaimer, the term of this patent is extended or adjusted under 35 U.S.C. 154(b) by 143 days.

(21) Appl. No.: 13/856,227

(22) Filed: Apr. 3, 2013

(65) Prior Publication Data

US 2014/0301504 A1    Oct. 9, 2014

(51) Int. Cl.
*H04B 7/02* (2006.01)
*H04L 1/02* (2006.01)
*H04B 7/04* (2006.01)

(52) U.S. Cl.
CPC .................................. *H04B 7/0413* (2013.01)
USPC ........................................................ 375/267

(58) Field of Classification Search
CPC .................................... H04B 7/02; H04L 1/02
USPC ........................................................ 375/267
See application file for complete search history.

(56) References Cited

U.S. PATENT DOCUMENTS

2004/0078412 A1*  4/2004  Nakanishi ..................... 708/520
2009/0279644 A1* 11/2009  Maru ............................. 375/340

* cited by examiner

*Primary Examiner* — Tanmay Shah
(74) *Attorney, Agent, or Firm* — Benjamin A. Balser; Balser & Grell IP Law, L.L.P.

(57) ABSTRACT

Method and system for decomposing a complex channel matrix at MIMO receiver is disclosed. The method comprises determining a real channel matrix from the complex channel matrix, wherein the number of rows and columns of the real channel matrix depends on a number of transmitting chains and a number of receiving chains. Thereafter, the below mentioned steps repeated predetermined number of times: A pre-Householder vector is determined based on the real channel matrix. A Householder vector is determined based on the pre-Householder vector. Thereafter a Householder matrix is determined based on the Householder vector and a transpose of the Householder vector without performing division operation. Finally, an orthogonal matrix and an upper triangular matrix are determined based on the Householder matrix, wherein the upper triangular matrix comprises a predetermined number of zeros in an upper triangle.

23 Claims, 5 Drawing Sheets

METHODS AND SYSTEMS FOR REDUCING COMPLEXITY OF MIMO DECODER

TECHNICAL FIELD

The presently disclosed embodiments generally relate to processing of signals at Multiple Input Multiple Output (MIMO) receiver. More particularly, the presently disclosed embodiments relate to a technique of QR decomposition in the MIMO receiver.

BACKGROUND

MIMO technology is one of the key technologies for enabling high throughput wireless communication. MIMO systems employ multiple antennas at both ends of a wireless link and can increase data rate by transmitting multiple data streams concurrently and in the same frequency band. Consequently, many wireless communication standards, for example, IEEE 802.11ac, IEEE 802.16e, and 3GPP LTE may take advantage of MIMO technology. Unfortunately, the considerable throughput improvements entail a significant increase in signal processing complexity to detect the transmitted signal with low probability of error at the receiver. This process of estimating the transmitted signal is usually termed as MIMO detector or decoder.

QR decomposition is one of the key techniques for MIMO receivers, since numerous MIMO detection algorithms require the QR decomposition of the channel matrix as starting point. The main purpose of the QR decomposition technique is to factorize a complex channel matrix as a product of an orthogonal matrix and an upper triangular matrix. The various MIMO decoders like linear detection by back substitution, successive interference cancellation (SIC), and tree-search-based algorithms such as the maximum-likelihood performance-achieving sphere decoder use the QR decomposition technique. Hence, to meet the demands of all required MIMO algorithms, a highly efficient low complexity QR decomposition module is needed.

A known technique of MIMO decoder method by combining QR based Zero Forcing (ZF) technique with successive interference cancellation and a reduced Maximum Likelihood (ML) search to obtain near V-BLAST decoding performance requires high number of division operations. Such a large number of the division operations make the known QR decomposition techniques impractical in real time for high-dimensional MIMO systems.

Broadly, three known techniques are widely used to achieve QR decomposition: a Gram-Schmidt technique, a Householder transformation technique, and a Givens rotation technique. The Gram-Schmidt technique obtains an orthogonal basis spanning column space of a matrix to be decomposed. Meanwhile, an orthogonality principle is utilized to derive the upper triangular matrix. The Householder transformation technique tries to zero out the elements below the diagonal matrix of each column vector at a stroke by reflection operations to get the upper triangular matrix. On the contrary, the Givens rotation technique zeros one element of the matrix at a time by two-dimensional rotation. An implementation of the Gram-Schmidt, Householder transformation, and Givens rotation techniques require multiplication, division and square-root operations, resulting in high hardware complexity and computation latency.

A technique using modified sequence of Givens rotations algorithm is also known, however, this technique still needs a large number of rotation and division operations for high-dimensional MIMO systems.

Therefore, there exists a need for a reduced complexity MIMO decoding technique.

SUMMARY

According to various embodiments illustrated herein, there is provided a method implementable on a Multiple Input Multiple Output (MIMO) receiver for decomposing a complex channel matrix, wherein the MIMO receiver comprises a plurality of receiving chains, wherein each of the plurality of receiving chains comprises a Radio Frequency (RF) demodulator and Analog Front End (AFE) and a baseband processing unit. The method comprises determining a real channel matrix from the complex channel matrix, wherein the number of rows and columns of the real channel matrix depends on a number of transmitting chains and a number of receiving chains. A Householder vector is then determined based on the real channel matrix. Thereafter a Householder matrix is determined based on the Householder vector and a transpose of the Householder vector without performing division operation. Finally, an orthogonal matrix and an upper triangular matrix are determined based on the Householder matrix, wherein the upper triangular matrix comprises a predetermined number of zeros in an upper triangle.

According to embodiments illustrated herein, there is provided a MIMO receiver for determining an estimation of transmitted symbols. The MIMO receiver comprises a plurality of receiving chains, wherein each of the plurality of receiving chain comprises at least a baseband processing unit. The baseband processing unit comprises a memory and a processing unit. The processing unit comprises a channel pre-processing module and a decomposing module. The decomposing module is configured for determining a real channel matrix from the complex channel matrix, wherein the number of rows and columns of the real channel matrix depends on a number of transmitting chains and a number of receiving chains. The decomposing module is further configured for determining a Householder vector based on the real channel matrix, determining a Householder matrix based on the house holder vector and a transpose of the house holder vector, wherein the determining Householder matrix does not involve performing division operation, and determining an orthogonal matrix and an upper triangular matrix based on the Householder matrix, wherein the upper triangular matrix comprises a predetermined number of zeros in an upper triangle.

According to embodiments illustrated herein, there is provided a computer program product for use with a computer. The computer program product comprises a non-transitory computer readable medium embodied therein a computer program for decomposing a complex channel matrix for a MIMO receiver, wherein the MIMO receiver comprises a plurality of receiving chains, wherein each of the plurality of receiving chain comprises an RF demodulator and Analog Front End (AFE) and a baseband processing unit. The computer program comprising: program instruction means for determining a real channel matrix from the complex channel matrix, wherein the number of rows and columns of the real channel matrix depends on a number of transmitting chains and a number of receiving chains; program instruction means for determining a Householder vector based on the real channel matrix; program instruction means for determining a Householder matrix based on the Householder vector and a transpose of the Householder vector, wherein the determining Householder matrix does not involve performing division operation; and program instruction means for determining an orthogonal matrix and an upper triangular matrix based on the Householder matrix, wherein the upper triangular matrix comprises a predetermined number of zeros in an upper triangle.

BRIEF DESCRIPTION OF DRAWINGS

One or more embodiments are set forth in the drawings and in the following description. The appended claims particularly and distinctly point out and set forth the invention.

The accompanying drawings, which are incorporated in and constitute a part of the patent application, illustrate various embodiments of various aspects of the ongoing description. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
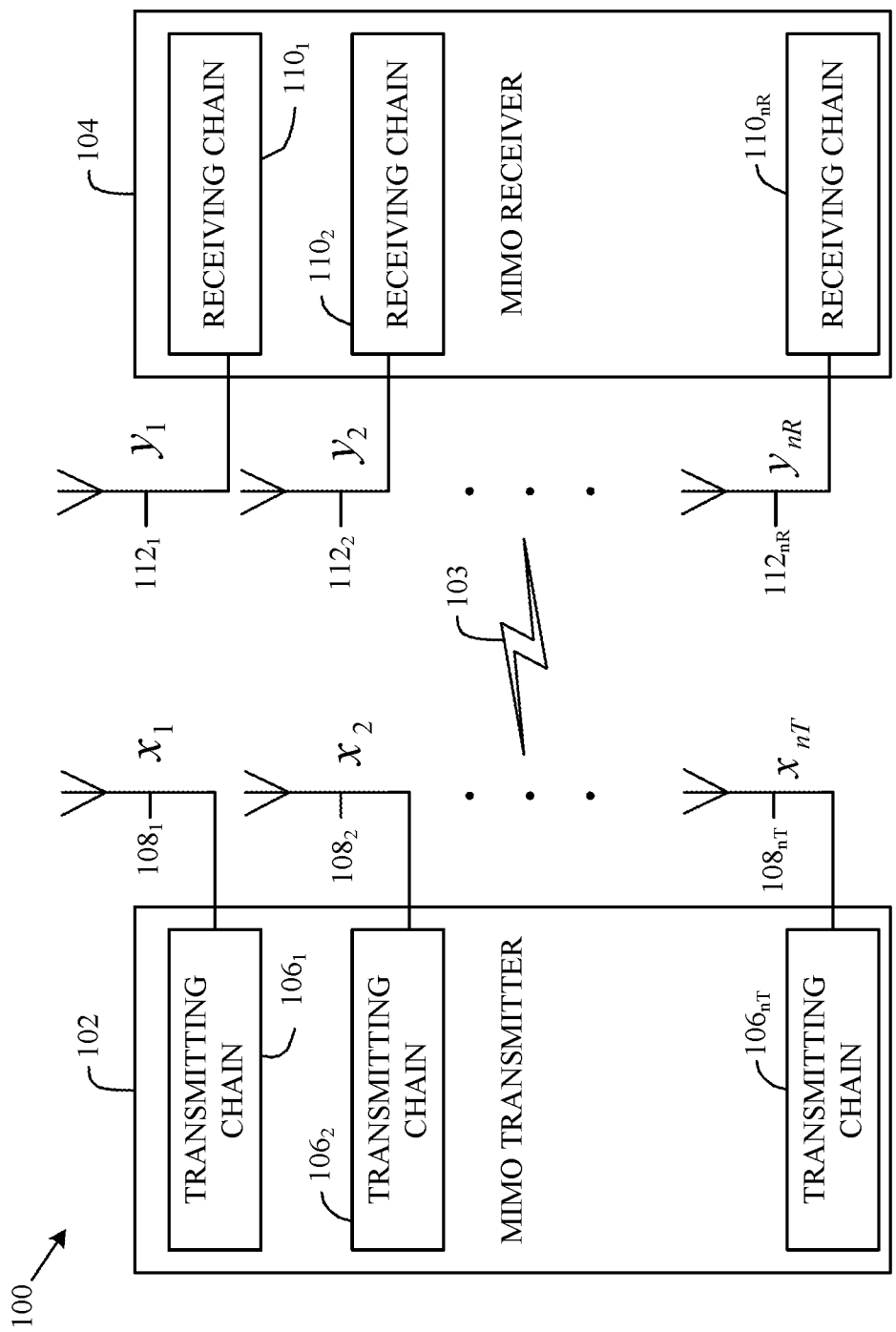
FIG. 1 is a block diagram illustrating a wireless communication system in which various embodiments can be implemented.

FIG. 1 is a block diagram illustrating a wireless communication system 100 in which various embodiments can be implemented. The wireless communication system 100 includes a MIMO transmitter 102, a wireless communication channel 103, and a MIMO receiver 104. For illustration purpose, the MIMO transmitter 102 and the MIMO receiver 104 are shown adjacent to each other; however, in practical reality they may be located at a distance.

The MIMO transmitter 102 includes an nT number of transmitting chains ($106_1$, $106_2$, ..., $106_{nT}$) and corresponding transmitting antennas ($108_1$, $108_2$, ..., $108_{nT}$) as shown. Each of the transmitting chains ($106_1$, $106_2$, ..., $106_{nT}$) is hereinafter referred to as a transmitting chain 106. Each of the transmitting antennas ($108_1$, $108_2$, ..., $108_{nT}$) is hereinafter referred to as a transmitting antenna 108. The transmitting chain 106 may comprise various modules/electronic circuits for performing encoding and/or modulation of a signal to be transmitted over the corresponding transmitting antenna 108. It is to be noted that the ongoing description is not limited with respect to the construction/implementation of the plurality of transmitting chains ($106_1$, $106_2$, ..., $106_{nT}$). Various signals are transmitted over the transmitting antennas ($108_1$, $108_2$, ..., $108_{nT}$) through the wireless communication channel 103 are ($x_1$, $x_2$, ..., $x_{nT}$) respectively. Thus, a complex transmit vector is defined as:

$$X_c = [x_1, x_2, \ldots, x_{nT}] \tag{1}$$

The MIMO receiver 104 includes an nR number of receiving chains ($110_1$, $110_2$, ..., $110_{nR}$) and corresponding receiving antennas ($112_1$, $112_2$, ..., $112_{nR}$) as shown. Each of the receiving chains ($110_1$, $110_2$, ..., $110_{nR}$) is hereinafter referred to as a receiving chain 110. Each of the receiving antennas ($112_1$, $112_2$, ..., $112_{nR}$) is hereinafter referred to as a receiving antenna 112. The receiving chain 110 (refer to FIG. 2) comprises various modules/electronic circuits for performing demodulating and determining an estimation of the transmit vector (e.g., transmitted signal/symbols) based on received signal/symbols. Various signals received at the receiving antennas ($112_1$, $112_2$, ..., $112_{nR}$) over the wireless communication channel 103 are ($y_1$, $y_2$, ..., $y_{nR}$) respectively. Thus, a complex received vector is defined as:

$$Y_c = [y_1, y_2, \ldots, y_{nR}] \tag{2}$$

The wireless communication channel 103 is a complex channel capable of supporting wireless transfer of signals/symbols. In an embodiment, the wireless communication channel 103 supports wireless communication as per various communication standards including, but not limited to, IEEE 802.11ac, IEEE 802.16e, and 3GPP LTE. Various examples of the wireless communication channel include but are not limited to TGac channel models A, B, D and E. While supporting the wireless communication, the wireless communication channel 103 may introduce various distortions due to frequency selective multipath fading. The frequency selective multipath fading channel is converted to frequency flat fading channel through the use of orthogonal frequency division multiplexing (OFDM) modulation on different carriers which are orthogonal to each other. RF demodulation and AFE in the receiver may introduce Gaussian noise or white noise.

In an embodiment, the flat fading wireless communication channel 103 may be represented by a complex channel matrix $H_c$.

$$H_c = \begin{bmatrix} h_{11} & h_{12} & \ldots & h_{1n_T} \\ h_{21} & h_{22} & \ldots & h_{2n_T} \\ \ldots & \ldots & \ldots & \ldots \\ h_{n_R 1} & \ldots & \ldots & h_{n_R n_T} \end{bmatrix} \tag{3}$$

Thus, the complex received vector can be represented as:

$$Y_c = H_c X_c + n_c \tag{4}$$

Where, $n_c$ is an nR×1 complex additive white/Gaussian noise vector and the subscript "c" indicates complex values.

Figure 2:
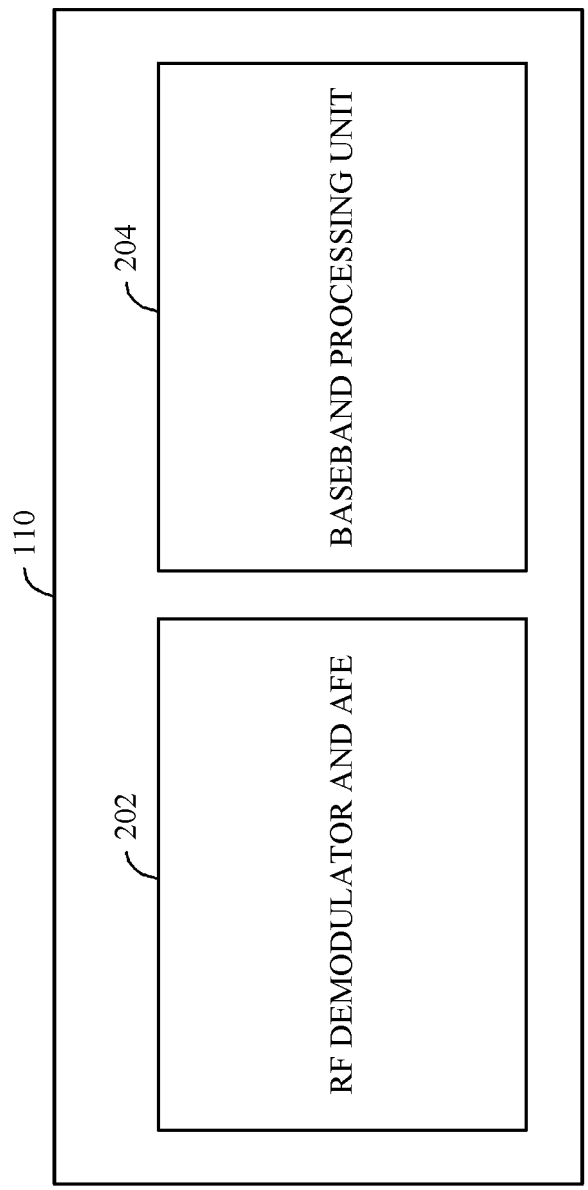
FIG. 2 is a block diagram illustrating a receiving chain of a MIMO receiver in accordance with at least one embodiment.

FIG. 2 is a block diagram illustrating the receiving chain 110 (e.g., any of receiving chains $110_1$, $110_2$, ..., or $110_{nR}$)

of the MIMO receiver 104 in accordance with at least one embodiment. The receiving chain 110 includes a Radio Frequency (RF) demodulator and Analog Front End (AFE) 202 and a baseband processing unit 204.

The RF demodulator and AFE 202 receives the signal received at the associated receiving antenna 112 and demodulates the received signal to generate a demodulated signal. The demodulated signal is passed through an Analog to digital convertor (ADC) to obtain digital baseband signal. It should be understood that any applicable/suitable technique can be used/applied by the RF demodulator and AFE 202 to generate the baseband signal without deviating from the scope of the ongoing description.

The baseband processing unit 204 receives the baseband signal from the RF demodulator and AFE 202 and estimates the transmitted signal/symbols by applying a novel and less complex QR decomposition technique of the ongoing description. The QR decomposition technique implemented by the baseband processing unit 204 involves decomposing a real channel matrix (H) into the orthogonal matrix (Q) and an upper triangular matrix (R) such that:

$$H = Q \times R \quad (5)$$

Figure 3:
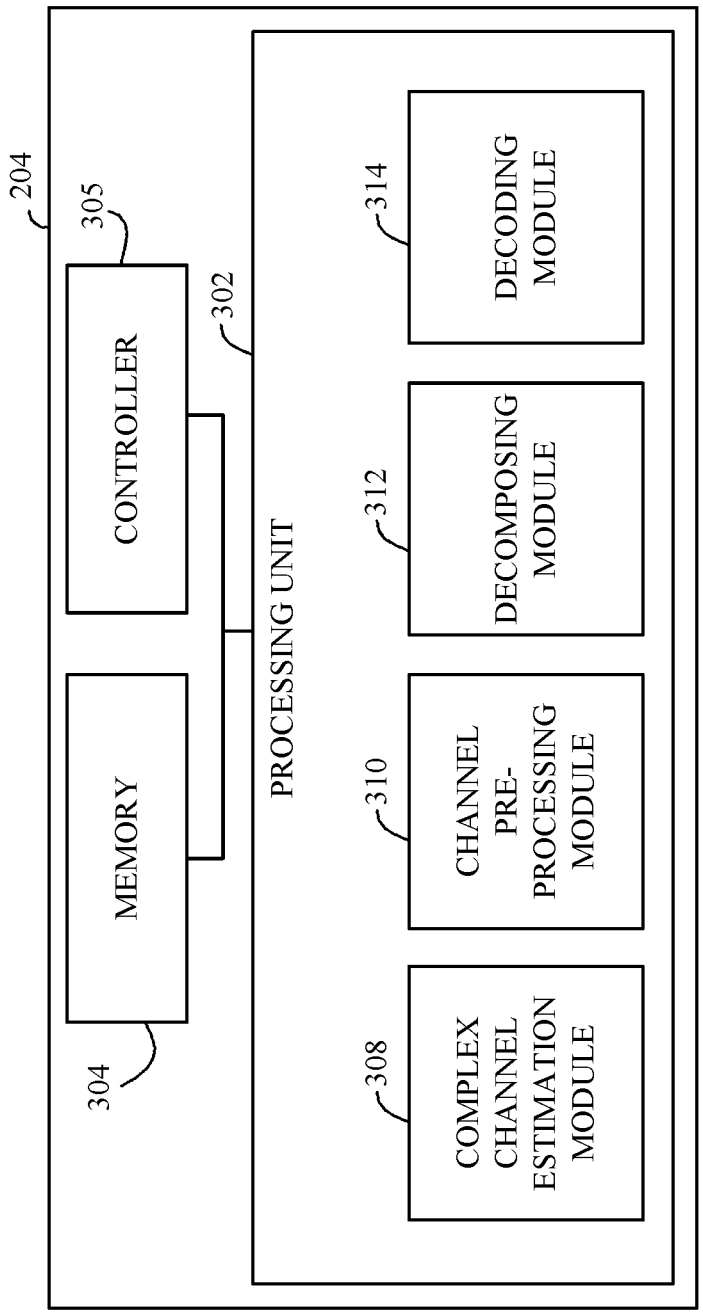
FIG. 3 is a block diagram illustrating a baseband processing unit of a receiving chain in accordance with at least one embodiment.

The baseband processing unit 204 is further described in greater detail in FIG. 3.

FIG. 3 is a block diagram illustrating the baseband processing unit 204 of the receiving chain 110 in accordance with at least one embodiment. The baseband processing unit 204 includes a processing unit 302 coupled to a memory 304 and a controller 305. The baseband processing unit 204 maybe realized as, for example, a hardware module using hardware description language (e.g., VHDL or Verilog HDL) or digital signal processor (DSP).

The processing unit 302 includes a complex channel estimation module 308, a channel pre-processing module 310, a decomposing module 312, and a decoding module 314.

Various types of the memory 304 may include, but are not limited to, cache, RAM, ROM, PROM, EPROM, EEPROM, flash, SRAM, and DRAM. The memory 304 may be implemented in the form of a storage device, which can be a hard disk drive or a removable storage drive, such as, a floppy disk drive, USB memory, memory cards, and an optical disk drive. The memory 304 stores the data to be accessed by the complex channel estimation module 308, the channel pre-processing module 310, the decomposing module 312, and the decoding module 314.

The controller 305 may be realized as, for example, a hardware module using hardware description language (e.g., VHDL or Verilog HDL) or digital signal processor (DSP). The controller 305 controls the functionality of the various hardware modules of the processing unit 302 and/or accessing of the memory 304 by the processing module.

The complex channel estimation module 308 receives the baseband signal from the RF demodulator and AFE 202 and determines the complex channel matrix ($H_c$). The complex channel estimation module 308 then stores the determined complex channel matrix ($H_c$) in the memory 304. Any applicable/suitable estimation technique can be used/applied by the complex channel estimation module 308 to estimate the complex channel without deviating from the scope of the ongoing description.

Thereafter, the channel pre-processing module 310 obtains the complex channel matrix ($H_c$) from the memory 304 determines a real channel matrix (H) and stores the determined real channel matrix (H) in the memory 304.

The decomposing module 312 retrieves the real channel matrix (H) from the memory 304, initializes the orthogonal matrix (Q) as an identity matrix (I) and the upper triangular matrix (R) as the real channel matrix (H). The decomposing module 312 then stores the orthogonal matrix (Q) and upper triangular matrix (R) in the memory 304.

The decomposing module 312 performs the steps of determining a pre-Householder vector (a) based on the real channel matrix (H), determining a Householder vector (v) based on the pre-Householder vector (a), determining a Householder matrix (P) based on the house holder vector (v) and a transpose of the house holder vector ($v^H$) without performing division operations, and determining (e.g., updating) the orthogonal matrix (Q) and the upper triangular matrix (R) based on the Householder matrix (P), wherein the upper triangular matrix (R) comprises a predetermined number of zeros in an upper triangle. These steps and some more additional steps performed by the decomposing module 312 are further explained in detail with an example in conjunction with FIG. 4 and FIG. 5. After repeating the above mentioned steps for a predetermined number of times (depending on the number of transmitting chains (nT) and the number of receiving chains (nR)), the decomposing module 312 outputs/determines the orthogonal matrix (Q) and the upper triangular matrix (R). Thereafter, the orthogonal matrix (Q) and the upper triangular matrix (R) are stored in the memory 304.

The decoding module 314 retrieves the orthogonal matrix (Q) and the upper triangular matrix (R) from the memory 304 and estimates the transmitted signal by applying various techniques, such as, but not limited to, ML detection, ZF detector, Minimum Mean Square Error (MMSE) decoder, or sphere decoder. However, it is apparent to a person having ordinary skills in the art that the scope of the ongoing description is not limited with respect to the use of the mention estimation/detection techniques.

Figure 4:
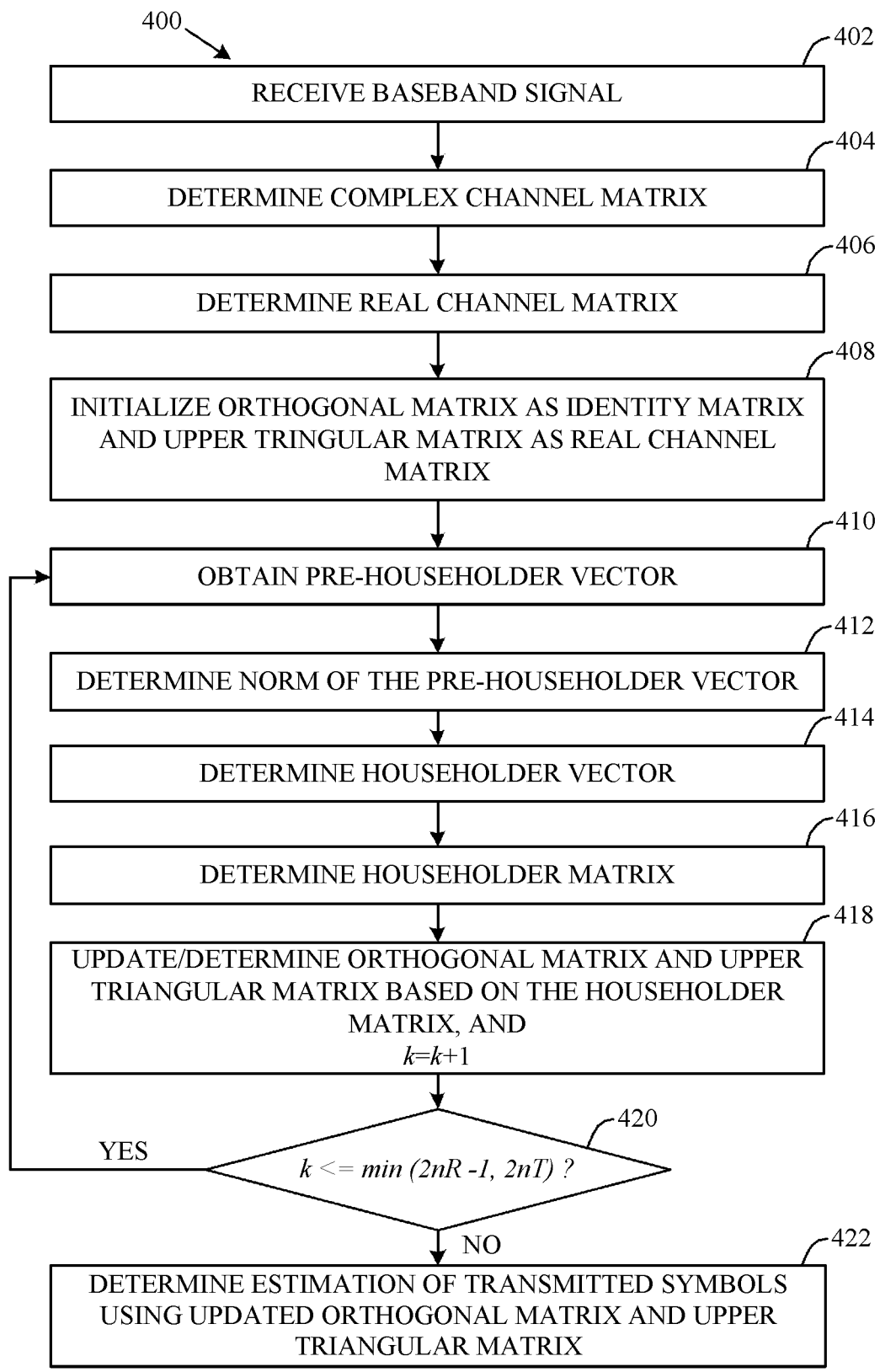
FIG. 4 is a flow diagram illustrating a method for performing QR decomposition at a MIMO receiver in accordance with at least one embodiment.

FIG. 4 is a flow diagram 400 illustrating a method for performing the QR decomposition at the MIMO receiver 104 in accordance with at least one embodiment.

At step 402, the baseband signal is received at the baseband processing unit 204 from the RF demodulator and AFE 202.

At step 404, the complex channel matrix ($H_c$) is determined. In an embodiment, the complex channel matrix ($H_c$) is determined by the complex channel estimation module 308 based on the preamble symbols of the received baseband signal.

$$H_c = \begin{bmatrix} h_{11} & h_{12} & \ldots & h_{1n_T} \\ h_{21} & h_{22} & \ldots & h_{2n_T} \\ \ldots & \ldots & \ldots & \ldots \\ h_{n_R 1} & \ldots & \ldots & h_{n_R n_T} \end{bmatrix}$$

For example, in case of nT=nR=2 (assumed for simplicity of explanation), a following complex channel matrix may be assumed for illustration purpose:

$$H_c = \begin{bmatrix} 1+2j & 2+j \\ 1+j & 2+j \end{bmatrix}$$

At step 406, the real channel matrix (H) is determined from the complex channel matrix ($H_c$) by the channel pre-processing module 310.

$$H = \begin{bmatrix} H_{11} & H_{12} & \dots & H_{1n_T} \\ H_{21} & H_{22} & \dots & H_{1n_T} \\ \dots & \dots & \dots & \dots \\ H_{n_R 1} & \dots & \dots & H_{n_R n_T} \end{bmatrix} \quad (6)$$

where, $$H_{ij} = \begin{bmatrix} \text{Re}\{h_{ij}\} & -\text{Im}\{h_{ij}\} \\ \text{Im}\{h_{ij}\} & \text{Re}\{h_{ij}\} \end{bmatrix},$$

Re{•} and Im{•} denotes the real part and the imaginary part of their arguments respectively.

For example, the real channel matrix of equation. 6 can be determined as:

$$H = \begin{bmatrix} 1 & -2 & 2 & -1 \\ 2 & 1 & 1 & 2 \\ 1 & -1 & 2 & -1 \\ 1 & 1 & 1 & 2 \end{bmatrix}$$

Thus, when nT=nR=2, a 4×4 real channel matrix is obtained from the 2×2 complex channel matrix.

At step 408, the orthogonal matrix (Q) is initialized as an identity matrix (I) and the upper triangular matrix (R) is initialized as the real channel matrix (H).

For example, $$H = R = \begin{bmatrix} 1 & -2 & 2 & -1 \\ 2 & 1 & 1 & 2 \\ 1 & -1 & 2 & -1 \\ 1 & 1 & 1 & 2 \end{bmatrix}$$

$$Q = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Thereafter, the following steps will be repeated for the predetermined number of times (N) depending on the number of the transmitting chains (nT) and the number of receiving chains (nR). In an embodiment, the N can be determined using following equation:

$$N = \min(2nR-1, 2nT) \quad (7)$$

Where, min( ) function indicates selection of minimum of given values.

Thus, in the ongoing example, $$N = \min(3,4) = 3$$

Thus, steps 410-418 will be repeated 3 (three) times.
For k=1 (i.e., a first iteration), At step 410, a pre-Householder vector ($a_k$) is determined by selecting elements below the principle diagonal of the upper triangular matrix (R) including the principle diagonal element, taking a column in each iteration by the decomposing module 312. Thus, in the ongoing example, $$a_k = a_1 = \begin{bmatrix} 1 \\ 2 \\ 1 \\ 1 \end{bmatrix}$$

At step 412, a norm of the pre-Householder vector ($a_k$) is determined by the decomposing module 312. In the ongoing example, Norm of $a_k = \alpha = \|a_k\| = \text{norm}(a_1) = \sqrt{1+4+1+1} = 2.6458$ At step 414, the Householder vector ($v_k$) is determined by the decomposing module 312. In an embodiment, the Householder vector ($v_k$) is determined as:

$$v_k = a_k - \text{sig}*\alpha e_1 \quad (8)$$

Wherein the sig is the sign that depends on the sign of the first element in the pre-Householder vector ($a_k$) and $e_1$ is a unity column matrix having number of elements equal to the number of elements in the pre-Householder vector ($a_k$)

Thus, in the ongoing example, sig=−sign($a_1(1)$)

$$v_1 = a_1 - \text{sig}*\text{norm}(a_1)*[1 \ 0 \ 0 \ 0]^T = \begin{bmatrix} 3.6458 \\ 2.0000 \\ 1.0000 \\ 1.0000 \end{bmatrix}$$

At step 416, the Householder matrix ($P_k$) is determined based on the Householder vector ($v_k$) and a transpose of the Householder vector ($v_k^H$), wherein the determining the Householder matrix ($P_k$) does not involve performing division operation. In an embodiment, the Householder matrix ($P_k$) is determined by the decomposing module 312. Further, various internal/sub-steps of determining the Householder matrix ($P_k$) are described in FIG. 5.

Figure 5:
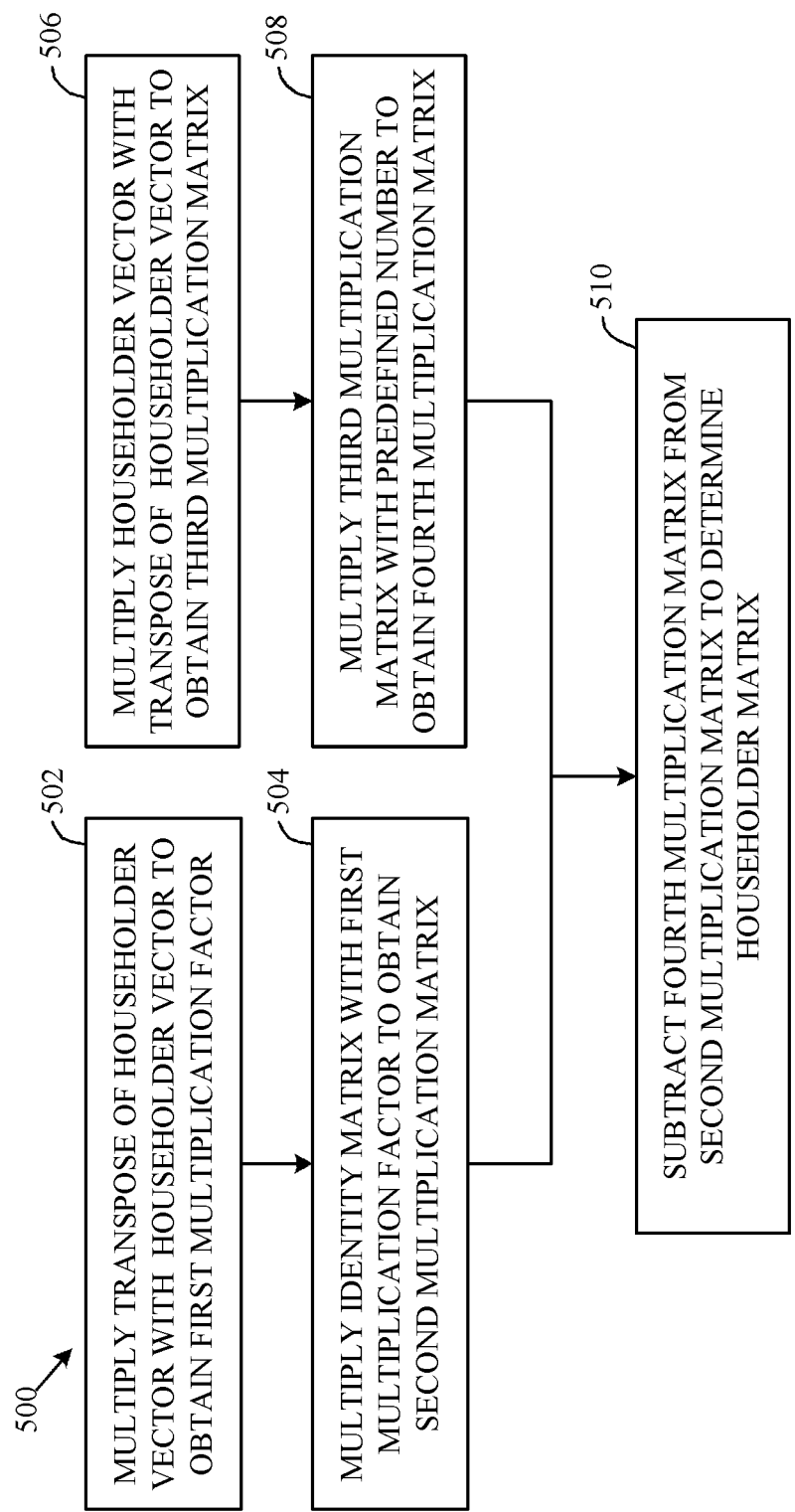
FIG. 5 is a flow diagram illustrating a method for determining a Householder matrix in accordance with an embodiment.

FIG. 5 is a flow diagram 500 illustrating a method (e.g., sub-steps of step 416) for determining the Householder matrix ($P_k$) in accordance with an embodiment. The steps in the flow diagram 500 are implemented on the decomposing module 312.

At step 502, the transpose of the Householder vector ($v_k^H$) is multiplied with the Householder vector ($v_k$) to obtain a first multiplication factor.

First multiplication factor $= v_k^H v_k$ (9)

At step 504, an identity matrix is multiplied with the first multiplication factor to obtain a second multiplication matrix.

Second multiplication matrix $= I_k v_k^H v_k$ (10)

At step 506, the Householder vector ($v_k$) is multiplied with the transpose of Householder vector ($v_k^H$) to obtain a third multiplication matrix.

Third multiplication matrix $= v_k v_k^H$ (11)

At step 508, the third multiplication matrix is multiplied with a predefined number to obtain a fourth multiplication matrix. In an embodiment, for example, the predefined number is 2 (two). However, the ongoing description should not be construed as limiting with this example of the predefined number being 2. Thus, Fourth multiplication matrix $= 2*v_k v_k^H$ (12)

At step 510, the fourth multiplication matrix is subtracted from the second multiplication matrix to determine the Householder matrix ($P_k$).

$$P_k = I_k v_k^H v_k - 2 * v_k v_k^H \qquad (13)$$

Thus, for the ongoing example (from FIG. 4), $$P_k = P_1$$

$$= \begin{bmatrix} (v_1^H v_1) & 0 & 0 & 0 \\ 0 & (v_1^H v_1) & 0 & 0 \\ 0 & 0 & (v_1^H v_1) & 0 \\ 0 & 0 & 0 & (v_1^H v_1) \end{bmatrix} - 2 * v_1 v_1^H$$

$$= \begin{bmatrix} -7.2915 & -14.5830 & -7.2915 & -7.2915 \\ -14.5830 & 11.2915 & -4.0000 & -4.0000 \\ -7.2915 & -4.0000 & 17.2915 & -2.0000 \\ -7.2915 & -4.0000 & -2.0000 & 17.2915 \end{bmatrix}$$

Where, k=1 (for first iteration).

It is to be noted that the steps 502-510 do not involve any division operation as compared to the computationally complex division operations in the prior art techniques. For example, in the first iteration (k=1), the present method avoids 16 (sixteen) division operations as compared to the prior art Householder transformation technique.

Referring back to FIG. 4:

At step 418, the orthogonal matrix (Q) and the upper triangular matrix (R) are updated/determined based on the Householder matrix ($P_k$) by the decomposing module 312.

In order to perform such update, the decomposing module 312 first determines an intermediate orthogonal matrix ($Q_k$).

$$Q_k = \begin{bmatrix} v_k^H v_k * I_{k-1} & 0_{1:k-1,1:2n_R-k+1} \\ 0_{1:2n_R-k+1,1:k-1} & P_{k:2n_R,k:2n_R} \end{bmatrix} \qquad (14)$$

Thus, for first iteration (k=1), $Q_k = P_1$.

Thereafter, the upper triangular matrix (R) is updated as:

$$R = Q_k R \qquad (15)$$

For k=1, $$R = Q_1 R = \begin{bmatrix} -51.0405 & 0.0000 & -51.0405 & -29.1660 \\ -0.0000 & 40.4575 & -29.8745 & 33.1660 \\ -0.0000 & -8.7085 & 14.0000 & -22.0000 \\ 0 & 29.8745 & -5.2915 & 35.8745 \end{bmatrix}$$

The orthogonal matrix (Q) may be updated as:

$$Q = Q * Q_k \qquad (16)$$

For k=1, $Q = Q * Q_1$

Thus, $Q = P_1$ for the first iteration.

In an embodiment, after determining the R and Q, they are scaled down to avoid overflow in fixed point implementation. In the process of scaling down, the scale factors, which are power of 2, are used to make implementation as a right shift without using division operation.

Thus, after scaling:

$$R = \begin{bmatrix} -3.19 & 0 & -3.1900 & -1.8229 \\ 0 & 2.5286 & -1.8672 & 2.0729 \\ 0 & -0.5443 & 0.8750 & -1.3750 \\ 0 & 1.8672 & -0.3307 & 2.2422 \end{bmatrix},$$

$$Q = \begin{bmatrix} -0.4557 & -0.9114 & -0.4557 & -0.4557 \\ -0.9114 & 0.7057 & -0.2500 & -0.2500 \\ -0.4557 & -0.2500 & 1.0807 & -0.1250 \\ -0.4557 & -0.2500 & -0.1250 & 1.0807 \end{bmatrix}$$

At step 420, it is determined whether k is less than or equal to min(2nR−1, 2nT). If k is less than or equal to N (e.g., 3 in the ongoing example), the steps 410-418 are repeated.

Thus, for k=2 (e.g., second iteration) following may be an output at various steps:

At step 410, $$a_2 = \begin{bmatrix} 2.5286 \\ -0.5443 \\ 1.8672 \end{bmatrix}$$

At step 412, norm ($a_2$)=3.1900

At step 414, $$v_2 = a_2 - sig * norm(a_2) * [1 \ 0 \ 0]^T = \begin{bmatrix} 5.7186 \\ -0.5443 \\ 1.8672 \end{bmatrix}$$

At step 416, $$P_2 = (v_2^H v_2) * \begin{bmatrix} 1 & 0 & 0 \\ 0 & 1 & 0 \\ 0 & 0 & 1 \end{bmatrix} - 2 * v_2 v_2^H = \begin{bmatrix} -28.9202 & 6.2251 & -21.3551 \\ 6.2251 & 35.8927 & 2.0325 \\ -21.3551 & 2.0325 & 29.5127 \end{bmatrix}$$

It is to be noted that, while determining $P_2$, the steps 502-510 do not involve any division operation as compared to the computationally complex division operations in the prior art techniques. For example, in the second iteration (k=2), the present method avoids 9 (nine) division operations as compared to the prior art Householder transformation technique.

At step 418, $$\text{forming } Q_2 = \begin{bmatrix} 36.4852 & 0 & 0 & 0 \\ 0 & -28.9202 & 6.2251 & -21.3551 \\ 0 & 6.2251 & 35.8927 & 2.0325 \\ 0 & -21.3551 & 2.0325 & 29.5127 \end{bmatrix}$$

Update the upper triangular matrix (R) by $$Q_2 R = \begin{bmatrix} -116.389 & 0 & -116.3890 & -66.5080 \\ 0 & -116.389 & 66.5080 & -116.3890 \\ 0 & 0 & 19.1107 & -31.8915 \\ 0 & 0 & 31.8915 & 19.1107 \end{bmatrix}$$

Update the orthogonal matrix (Q) by $$Q*Q_2 = \begin{bmatrix} -16.6270 & 33.2540 & -22.9570 & 5.0882 \\ -33.2540 & -16.6270 & -5.0882 & -22.9570 \\ -16.6270 & 16.6270 & 36.9796 & 3.8463 \\ -16.6270 & -16.6270 & -3.8463 & 36.9796 \end{bmatrix}$$

In an embodiment, after determining the R and Q, they are scaled down to avoid overflow in fixed point implementation. In the process of scaling down, the scale factors, which are power of 2, are used to make implementation as a right shift without using division operation.
Thus, after scaling:

$$R = \begin{bmatrix} -3.6372 & 0 & -3.6372 & -2.0784 \\ 0 & -3.6372 & 2.0784 & -3.6372 \\ 0 & 0 & 0.5972 & -0.9966 \\ 0 & 0 & 0.9966 & 0.5972 \end{bmatrix},$$

$$Q = \begin{bmatrix} -0.5196 & 1.0392 & -0.7174 & 0.1590 \\ -1.0392 & -0.5196 & -0.1590 & -0.7174 \\ -0.5196 & 0.5196 & 1.1556 & 0.1202 \\ -0.5196 & -0.5196 & -0.1202 & 1.1556 \end{bmatrix}$$

For k=3 (e.g., third iteration), following may be an output at various steps:
At step 410, $$a_3 = \begin{bmatrix} 0.5972 \\ 0.9966 \end{bmatrix}$$

At step 412, norm $(a_3)$=1.1618
At step 414, $$v_3 = a_3 - sig * norm(a_3) * [1\ 0]^T = \begin{bmatrix} 1.7591 \\ 0.9966 \end{bmatrix}$$

At step 416, $$P_3 = (v_3^H v_3) * \begin{bmatrix} 1 & 0 \\ 0 & 1 \end{bmatrix} - 2*v_3 v_3^H = \begin{bmatrix} -2.1011 & -3.5062 \\ -3.5062 & 2.1011 \end{bmatrix}$$

It is to be noted that, while determining $P_3$, the steps 502-510 do not involve any division operation as compared to the computationally complex division operations in the prior art techniques. For example, in the second iteration (k=3), the present method avoids 4 (four) division operations as compared to the prior art Householder transformation technique.
At step 418, $$\text{forming } Q_2 = \begin{bmatrix} 4.0875 & 0 & 0 & 0 \\ 0 & 4.0875 & 0 & 0 \\ 0 & 0 & -2.1011 & -3.5062 \\ 0 & 0 & -3.5062 & 2.1011 \end{bmatrix}$$

Update the upper triangular matrix (R) by $$Q_3 R = \begin{bmatrix} -14.8669 & 0 & -14.8669 & -8.4954 \\ 0 & -14.8669 & 8.4954 & -14.8669 \\ 0 & 0 & -4.7491 & 0 \\ 0 & 0 & 0 & 4.7491 \end{bmatrix}$$

Update the orthogonal matrix (Q) by $$Q*Q_3 = \begin{bmatrix} -2.1238 & 4.2477 & 0.9498 & 2.8494 \\ -4.2477 & -2.1238 & 2.8494 & -0.9498 \\ -2.1238 & 2.1238 & -2.8494 & -3.7993 \\ -2.1238 & -2.1238 & -3.7993 & 2.8494 \end{bmatrix}$$

In an embodiment, after scaling:

$$R = \begin{bmatrix} -3.7167 & 0 & -3.7167 & -2.1238 \\ 0 & -3.7167 & 2.1238 & -3.7167 \\ 0 & 0 & -1.1873 & 0 \\ 0 & 0 & 0 & 1.1873 \end{bmatrix},$$

$$Q = \begin{bmatrix} -0.5310 & 1.0619 & 0.2375 & 0.7124 \\ -1.0619 & -0.5310 & 0.7124 & -0.2375 \\ -0.5310 & 0.5310 & -0.7124 & -0.9498 \\ -0.5310 & -0.5310 & -0.9498 & 0.7124 \end{bmatrix}$$

Thus, in case of nR=nT=2, the present method avoids 29 division operation, saving a considerable amount of computation time and offers reduced complexity QR decomposition. Also, there are nR zeros in the upper triangular portion of R. The additional zeros are due to formation of real channel matrix by the channel pre-processing module 310.

If at step 420 it is determined that k is greater than min (2nR−1, 2nT), the updated orthogonal matrix (Q) and the upper triangular matrix (R) are stored in the memory 304 by the decomposing module and step 422 is executed by the decoding module 314.

At step 422, estimation of transmitted symbols is determined based on the updated orthogonal matrix (Q) and the upper triangular matrix (R).

After the QR decomposition, the decoding module 314 retrieves the updated orthogonal matrix (Q) and the upper triangular matrix (R) from the memory 304 to determine the real received signal as:

$$y = QRx + n \tag{17}$$

Multiplying both sides of the equation 17 by $Q^T$ (i.e., the transpose of Q):

$$Q^T y = Rx + \hat{n} \tag{18}$$

$$\hat{y} = Rx + \hat{n} \tag{19}$$

Where, $\hat{y} = Q^T y$, $\hat{n} = Q^T n$ and $Q^T Q = I$.

The equation 19 can be solved by various techniques including, but not limited to, ZF detector, Minimum Mean Square Error (MMSE) decoder, and sphere decoder, explanation of which is out of the scope of the ongoing description and the ongoing description is not limited with respect to the use of the mention techniques for determining estimation of the transmitted signal by the decoding module 314.

Various modules like, the complex channel estimation module 308, the channel pre-processing module 310, the decomposing module 312, and the decoding module 314 have been illustrated as hardware modules as a part of the processing unit 302, however, it is understood by a person having ordinary skills in the art that functionality offered by these modules can also be implemented by a computer program stored in the memory 304 executable by the controller 305 without deviating from the basic scope of the ongoing description.

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Various embodiments of the method, MIMO receiver, and the computer program product for the QR decomposition have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Various embodiments described above have numerous advantages. As described above, the present method does not involve performing any division operation while performing the QR decomposition. This reduces the complexity of the MIMO receiver to a great extent. For example, in case of 2×2 MIMO systems, the present method avoids 29 division operations. Moreover, this process is required for all subcarriers of received OFDM symbols, the resultant savings is in multiplicative factor of the total saving. For example, total division operations that can be avoided are 29M (in the example considered, M is 234 for 80 MHz case). Such a reduction in the complex operations results in a great reduction of the computing complexity at the MIMO receiver and hence simpler/low cost solution can be realized. Also, there are additional nR zeros in the R matrix in the upper triangular portion, which results in some savings in multiplication operations (as the result of multiplication with zero will always be zero). This is obtained by way of formation of the real channel matrix from complex matrix and not captured in traditional methods. These zeros also reduce the complexity of post QR decomposition job in MIMO receiver and it depends on type of MIMO decoder used (ZF/MMSE/ML or Sphere decoder). Savings here increase with increased MIMO size (e.g., nR, and nT).

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

What is claimed is:

1. A method implementable on a Multiple Input Multiple Output (MIMO) receiver for decomposing a complex channel matrix, wherein the MIMO receiver comprises a plurality of receiving chains, wherein each of the plurality of receiving chains comprises a Radio Frequency (RF) demodulator and Analog Front End (AFE), and a baseband processing unit, the method comprising:
   determining a real channel matrix from the complex channel matrix, wherein the number of rows and columns of the real channel matrix depends on a number of transmitting chains and a number of receiving chains;
   determining a Householder vector based on the real channel matrix;
   determining a Householder matrix based on the Householder vector and a transpose of the Householder vector, wherein the determining Householder matrix does not involve performing division operation; and
   determining an orthogonal matrix and an upper triangular matrix based on the Householder matrix, wherein the upper triangular matrix comprises a predetermined number of zeros in an upper triangle.

2. The method of claim 1 further comprising obtaining a baseband signal received on each receiving chain at the RF demodulator and AFE.

3. The method of claim 2 further comprising determining, at the baseband processing unit, an estimation of transmitted symbols based on the received baseband signal on each receiving chain of the plurality of receiving chains.

4. The method of claim 2 further comprising determining, at the baseband processing unit, the complex channel matrix based on preamble symbols of the received baseband signal.

5. The method of claim 1 further comprising initializing the orthogonal matrix as an identity matrix.

6. The method of claim 1 further comprising initializing the upper triangular matrix as the real channel matrix.

7. The method of claim 1 further comprising obtaining a pre-Householder vector by selecting elements below the principle diagonal of the upper triangular matrix including the principle diagonal element, one column at each iteration.

8. The method of claim 7 further comprising obtaining a norm of the pre-Householder vector.

9. The method of claim 8 further comprising repeating the steps of determining the pre-Householder vector, obtaining the norm of pre-Householder vector, determining the Householder vector, determining the Householder matrix, and determining the orthogonal matrix and the upper triangular matrix, for a predetermined number of times depending on the number of transmitting chains and the number of receiving chains.

10. The method of claim 9, wherein the Householder vector is determined based on the pre-Householder vector, the norm of the pre-Householder vector, or the sign of the first element of the pre-Householder vector.

11. The method of claim 1, wherein determining the Householder matrix comprises:
 multiplying the transpose of the Householder vector with the Householder vector to obtain a first multiplication factor; and
 multiplying an identity matrix with the first multiplication factor to obtain a second multiplication matrix.

12. The method of claim 11, wherein determining the Householder matrix further comprises:
 multiplying the Householder vector with the transpose of the Householder vector to obtain a third multiplication matrix; and
 multiplying the third multiplication matrix with a predefined number to obtain a fourth multiplication matrix.

13. The method of claim 12 further comprises subtracting the fourth multiplication matrix from the second multiplication matrix to determine the Householder matrix.

14. The method of claim 1 further comprising determining an estimation of transmitted symbols at the MIMO receiver based on the orthogonal matrix and the upper triangular matrix.

15. The method implementable on a Multiple Input Multiple Output (MIMO) receiver for determining an estimation of transmitted symbols, wherein the MIMO receiver comprises a plurality of receiving chains, wherein the each of the plurality of receiving chains comprises an RF demodulator, AFE and a baseband processing unit, the method comprising:
 decomposing a complex channel matrix, wherein the decomposing comprises the steps of:
  determining a real channel matrix from the complex channel matrix, wherein the number of rows and columns of the real channel matrix depends on a number of transmitting chains and a number of receiving chains;
  determining a Householder vector based on the real channel matrix;
  determining a Householder matrix based on the house holder vector and a transpose of the house holder vector, wherein the determining Householder matrix does not involve performing division operation; and
  determining an orthogonal matrix and an upper triangular matrix based on the Householder matrix, wherein the upper triangular matrix comprises a predetermined number of zeros in an upper triangle; and
 determining the estimation of transmitted symbols based on the orthogonal matrix and the upper triangular matrix.

16. A MIMO receiver for determining an estimation of transmitted symbols, wherein the MIMO receiver comprises a plurality of receiving chains, wherein each of the plurality of receiving chain comprises at least a baseband processing unit, the baseband processing unit comprising:
 a channel pre-processing module configured for determining a real channel matrix from the complex channel matrix, wherein the number of rows and columns of the real channel matrix depends on a number of transmitting chains and a number of receiving chains; and
 a decomposing module configured for:
  determining a Householder vector based on the real channel matrix,
  determining a Householder matrix based on the house holder vector and a transpose of the house holder vector, wherein the determining Householder matrix does not involve performing division operation, and
  determining an orthogonal matrix and an upper triangular matrix based on the Householder matrix, wherein the upper triangular matrix comprises a predetermined number of zeros in an upper triangle.

17. The MIMO receiver of claim 16 further comprising a complex channel estimation module for determining the complex channel matrix from a received baseband signal.

18. The MIMO receiver of claim 16, wherein the decomposing module is further configured for:
 a. initializing the orthogonal matrix as an identity matrix; and
 b. initializing the upper triangular matrix as the real channel matrix.

19. The MIMO receiver of claim 16, wherein the decomposing module is further configured for obtaining a pre-Householder vector by selecting elements below the principle diagonal of the upper triangular matrix including the principle diagonal element, one column at each iteration.

20. The MIMO receiver of the claim 19, wherein the decomposing module is further configured for determining the Householder vector based on the pre-Householder vector, a norm of the pre-Householder vector, or the sign of the first element of the pre-Householder vector.

21. The MIMO receiver of the 16 further comprising a decoder module for determining the estimation of transmitted symbols based on the orthogonal matrix and the upper triangular matrix.

22. The MIMO receiver of claim 16, wherein each of the plurality of receiving chains further comprises an RF demodulator and AFE for receiving a baseband signal.

23. A computer program product for use with a computer, the computer program product comprising a non-transitory computer readable medium embodied therein a computer program for decomposing a complex channel matrix for a MIMO receiver, wherein the MIMO receiver comprises a plurality of receiving chains, wherein each of the plurality of receiving chain comprises an RF demodulator, AFE and a baseband processing unit, the computer program comprising:

program instruction means for determining a real channel matrix from the complex channel matrix, wherein the number of rows and columns of the real channel matrix depends on a number of transmitting chains and a number of receiving chains;

program instruction means for determining a Householder vector based on the real channel matrix;

program instruction means for determining a Householder matrix based on the Householder vector and a transpose of the Householder vector, wherein the determining Householder matrix does not involve performing division operation; and program instruction means for determining an orthogonal matrix and an upper triangular matrix based on the Householder matrix, wherein the upper triangular matrix comprises a predetermined number of zeros in an upper triangle.

\* \* \* \* \*